Aug. 13, 1935.    G. T. REICH    2,010,929
METHOD OF DISTILLING ALCOHOL CONTAINING FERMENTED LIQUORS
Filed Oct. 13, 1931    3 Sheets-Sheet 1

Aug. 13, 1935.  G. T. REICH  2,010,929

METHOD OF DISTILLING ALCOHOL CONTAINING FERMENTED LIQUORS

Filed Oct. 13, 1931  3 Sheets-Sheet 3

Inventor:
Gustave T. Reich
By Byrnes, Townsend & Potter
Attorneys.

Patented Aug. 13, 1935

2,010,929

UNITED STATES PATENT OFFICE 2,010,929

METHOD OF DISTILLING ALCOHOL-CONTAINING FERMENTED LIQUORS

Gustave T. Reich, Philadelphia, Pa.

Application October 13, 1931, Serial No. 568,637

7 Claims. (Cl. 202—45)

This invention relates to a method for distillation and concentration, and is particularly adapted to the recovery of the products obtained by the fermentation of saccharine materials, such, for example, as corn, molasses, starch, glucose from grain or cellulose, various grains, malt and similar material. When these materials are subjected to fermentation by means of yeast or bacteria, fermentation liquors containing valuable organic compounds, both volatile and non-volatile, as well as valuable inorganic compounds, are obtained.

In order to obtain the volatile organic products of fermentation the fermented liquors or "beers" are subjected to distillation, either in batch or continuous stills. This method of recovery leaves a residue containing valuable materials in a very dilute condition and the recovery of these materials from the residual liquors is quite expensive and involves expensive equipment for distillation and concentration.

An object of the present invention is to provide a method and apparatus whereby the recovery of the product of the fermentation of saccharine materials is rendered more economical of apparatus, floor space and operating expenses.

A further object of the invention is to provide for simultaneously carrying on the evaporation of the fermentation liquid and the rectification of the volatile organic products.

Other objects of the invention will appear from the following description of the invention:

Briefly stated the invention comprises subjecting alcoholic fermentation liquors to multiple effect evaporation wherein the liquors are subjected to evaporation under progressively lowered pressures.

In the operation of the process, the first effect in which the pressure is the highest removes the greater portion of the alcohol in a more concentrated state than the alcohol first recovered usually is. In the first effect up to 95% of the alcohol contained in the liquor is removed and is obtained in concentrations of up to 30% alcohol. This vapor is carried only in part to the still so that a great part of the expense of rectification is avoided. This may be done by separating the vapor into two portions, one of which (the richer in alcohol content) passes directly to the rectifier, or by using the whole of the vapor to heat the steam box of the second effect and then separating the vapors, which may be condensed in part in this steam chest, and subjecting only the alcohol-containing part to rectification. The same kind of treatment might be given to the vapors from the main chamber of effect 2, if desired. The vapor from the first effect or a portion thereof is used to heat the second effect whereby it is condensed to liquid form. The liquid from the first effect is passed into the second effect which is under lower pressure than the first effect, and wherein the remainder of the alcohol is evaporated from the liquor together with a substantial portion of the water. The final concentration of the liquor is effected in a third effect operating under still lower pressure and heated by the vapor from the second effect, the condensate being rectified or returned to the system with the alcoholic fermentation liquors. The vapor from the third effect, being substantially only water, is sent to waste.

In this manner the alcohol in the fermentation liquors is recovered in relatively concentrated form during the evaporation of the liquors without the necessity of subjecting the liquors to a preliminary distillation operation to remove the alcohol content.

The invention will be more particularly described, for the purpose of illustration, with reference to the accompanying drawings, of which:

The invention will be particularly described with reference to the production of ethyl alcohol, it being understood that it is equally applicable to the production of other volatile fermentation products, such as butanol and the like.

Figure 1:
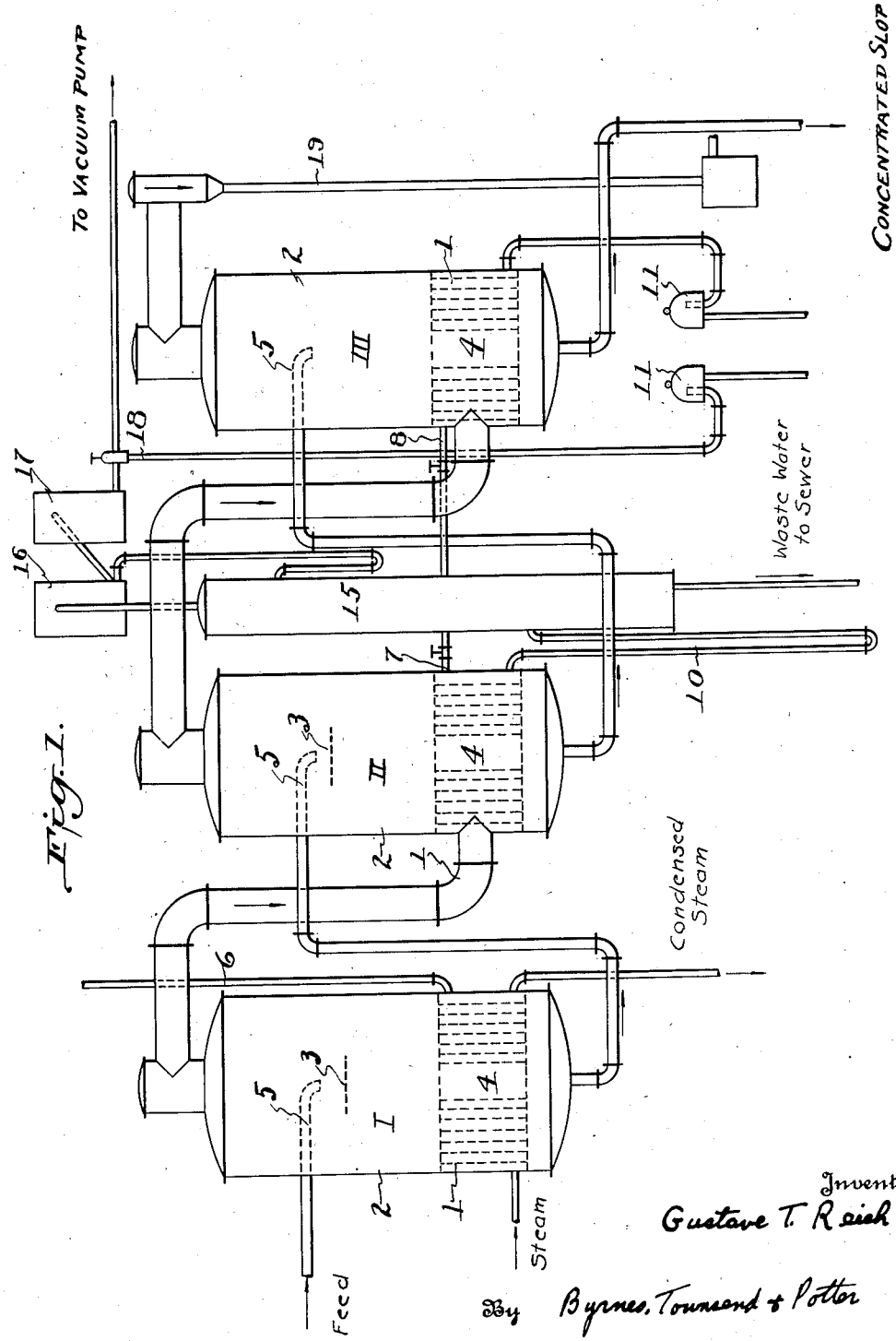
Fig. 1 is a diagrammatic showing of a vertical section of a triple effect evaporator wherein the condensate from the steam chest of the second effect passes to a rectifying column.
Figure 2:
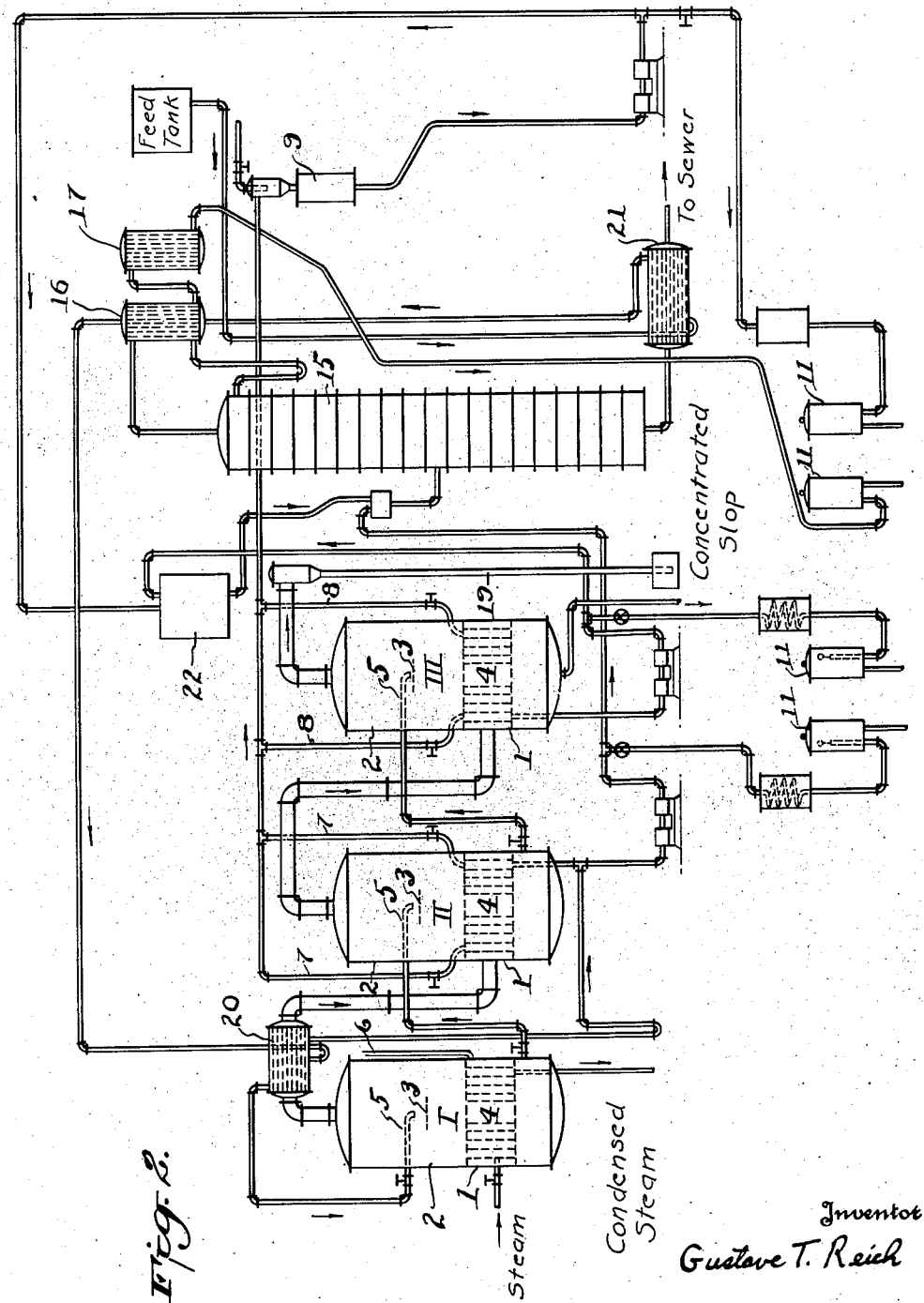
Fig. 2 is a diagrammatic showing of another modification of the invention having a heat interchanger between the first and second effects, the condensate from which also passes to a rectifying column.
Figure 3:
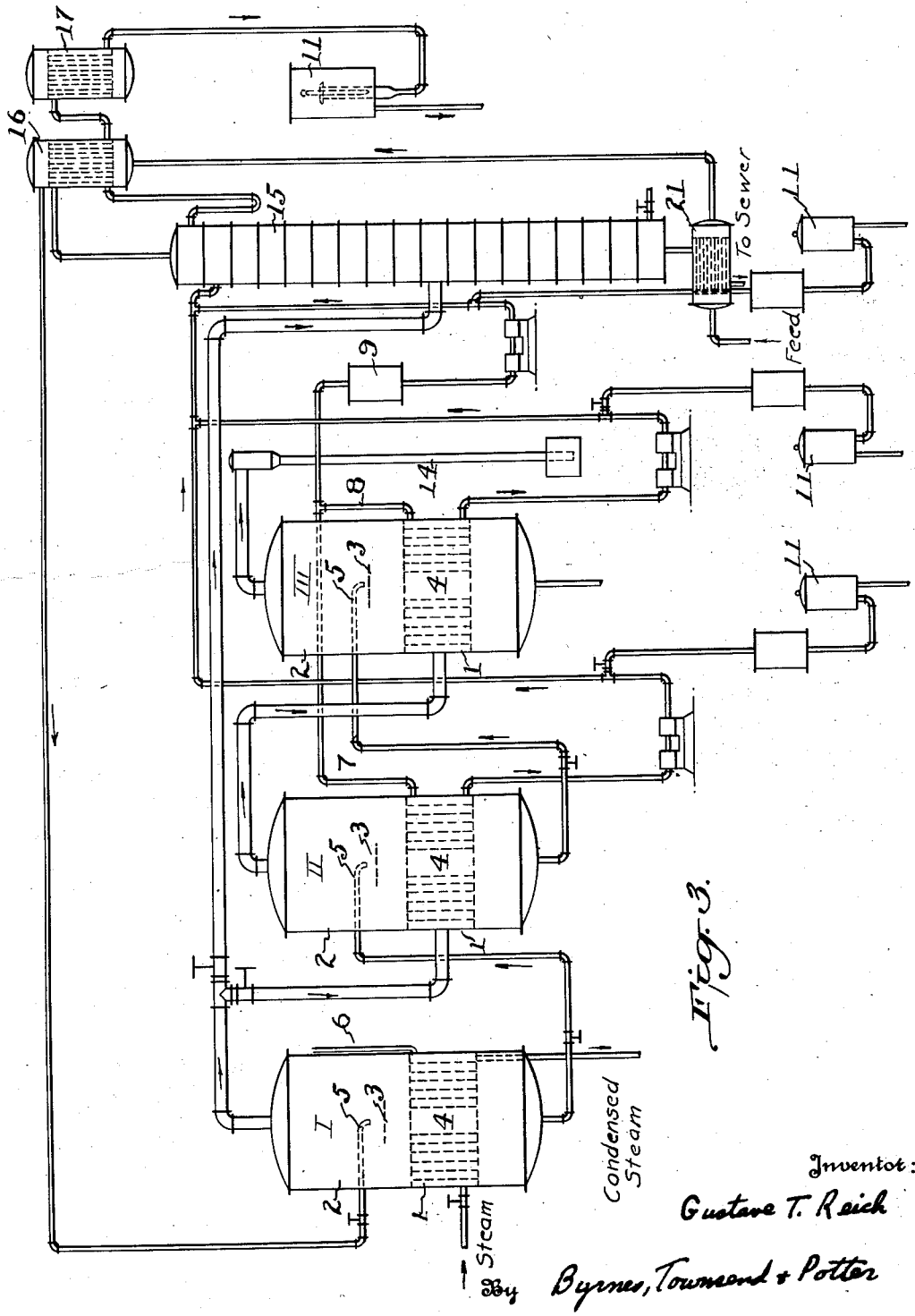
Fig. 3 is a diagrammatic showing of a further modification of the invention.

Referring to the drawings I, II and III are the three units of the triple effect evaporator system. Each unit is of conventional construction excepting as to the following particulars: The steam chest 1 occupies about the lower one-third of the vessel 2 and a baffle plate 3 of the same shape, for example circular, as the cross-sectional shape of the down-take pipe 4 and at least as large and preferably larger, is situated directly above the down-take pipe. The feed line 5 enters the vessel 2 at a point about one-third of the height of the vessel 2 from the top thereof and delivers onto the baffle plate 3. As illustrated in Fig. 1, there is a baffle plate in only effects I and II, a baffle plate in effect III being unnecessary as will appear hereinafter, although effect III also may contain a baffle plate as shown in Figs. 2 and 3 without altering the operation of the apparatus.

The arrangement and size of the baffle plate with reference to the feed line and the down-take pipe is very important. The object to be attained is to prevent the feed of liquid to be evaporated from dropping directly into the down-take pipe and to spread it as evenly as possible over the upper plate or surface of the steam chest. In this way the cool feed liquid serves to chill and break any foam above the steam chest and at the same time the contact of the upflowing hot vapors generated in the heating tubes with the finely divided feed liquid serves to heat the latter and to thereby drive off from it dissolved gases and some of its alcohol content without the production of foam, i. e. vaporization from suspended or falling drops of liquid apparently takes place at the surfaces thereof without foaming.

It is impossible to state the space relationship of the steam chest, the baffle plate and the feed pipe since this depends upon the properties of the liquid under treatment, the vacuum maintained, if any, the size of the evaporator, the relative sizes of the baffle plate and the down-take pipe and probably other conditions. It is, however, readily possible to adjust the relative positions of the baffle plate and feed pipe with reference to each other and with reference to the steam chest in any particular apparatus operating under any particular set of conditions so as to obtain the desired distribution of the incoming liquid over the upper surface of the steam chest. Ordinarily the desired adjustment may be obtained by movement of the baffle plate only. In general the higher the vacuum in the evaporator the closer is the baffle plate to the feed pipe. At atmospheric or superatmospheric pressure the baffle plate may be about 12 inches from the feed pipe, while at pressures such as are employed in vacuum evaporators the baffle plate may be only 2 or 3 inches from the feed pipe.

As stated, the principal purpose of the baffle plate is to distribute the incoming liquid and prevent it from falling directly into the down-take pipe. It follows, of course, that the down-take pipe may be of any desired shape or that there may be a plurality of down-take pipes each protected by a baffle plate without departing from my invention. A single relatively large down-take pipe is, however, preferred.

To summarize I have found that by (1) positioning the feed pipe relatively far above the liquid level in the evaporator, (2) providing a relatively large down-take pipe, and (3) providing a baffle plate of such size and so situated as to prevent the liquid from falling directly into the down-take pipe and distribute it over the surface of the steam chest, the following results are accomplished: (a) the gases dissolved in the incoming liquid are expelled from it before it mixes with the body of liquid in the evaporator, (b) the bulk of the alcohol content of the incoming liquid is vaporized therefrom without boiling the liquid and before it mixes with the body of liquid in the evaporator, and (c) foaming is largely avoided and any foam formed is broken. The details of construction above-mentioned are given mainly to give a clear idea of the way in which an apparatus may be constructed to carry out my process, and while useful for this purpose are not a limitation on my invented process.

Figs. 2 and 3 show a preferred arrangement of the so-called non-condensible gas lines, i. e. the lines for the removal from the steam chests of air and other non-condensible gases. Usually in triple effect evaporators the non-condensible gas lines, which shall be called for convenience vent lines, are connected either to the vapor space of the same body or all the units are connected to a single manifold which in turn is connected to the barometric condenser or to a single vacuum pump. I have found that this arrangement of the vent lines is not satisfactory in an apparatus for the evaporation of beer and similar liquids containing alcohol. My preferred arrangement is as illustrated in Fig. 2. The vent line 6 from the steam chest of effect I is simply vented to the atmosphere, preferably through a pressure valve not shown or is connected to any suitable means for removing gases from the steam chest while the vent lines 7 and 8 from the steam chests of effects II and III may be connected to a single water cooled condenser 9 for the condensation of volatile organic products present in the non-condensible gases and also to a vacuum pump. Thus the removal of gases from the steam chests of effects II and III is independent of the removal of gases from the steam chest of effect I. The operation of the apparatus is determined by passing the condensates from the several units to testing apparatus, for example alcoholometers 11, and regulating the supply of live steam to the first unit and the pressures in the several units accordingly.

All of the systems of apparatus shown in the drawings include a rectifying column 15, and the usual barometric condenser 19, receiving the vapors from effect III.

As shown, for example, in Fig. 1. The process operates so that the distillate from effect I is separated in the steam chest 4 of effect II into a condensate containing the major part of the alcohol and a vapor containing the air and other non-condensible gases that is not necessarily subjected to rectification. The condensate from effect II passes by way of pipe 10 to the rectifying column 15 which has the usual dephlegmator 16 and the condenser 17 which latter delivers through the pipe 18 into the tap 11. Vapor lines 7 and 8 may connect into the column and through it to the vacuum pump. By this arrangement it is possible to evaporate and rectify simultaneously and thereby to directly produce a distillate of high concentration. The apparatus produces an alcohol distillate from the column of about 190° and a distillate in effect III of about 4°.

In the apparatus shown in Fig. 2 heat exchangers 20 and 21 are provided. The condensate from the heat exchanger 20 between the vapor from the first effect and the feed to that effect passes directly to the rectifier together with the condensate from the steam chest of the second effect. The condensate from the steam chest of the third effect is preferably passed into a feed tank 22, whence it may be mixed with the aforesaid condensates. In this way a uniform feed and density may be assured by controlling the density of the feed by means of a regulator attached to the feed line.

The fermentation liquid to be concentrated and distilled passes, in the apparatus shown in Fig. 2, serially through heat exchanger 21, dephlegmator 16 and heat exchanger 20 to the first effect.

In the apparatus shown in Fig. 3 the feed liquor passes through heat exchanger 21 and dephlegmator 16 to the first effect. Heat exchangers may also be placed in other positions, so as to utilize, for example, the heat in the condensed steam from the first effect.

In operating the system shown in Fig. 3 twice as much vapor is produced in the first effect as in the second and third effects. One-half of the vapors from the first effect are passed directly to the rectifier at a pressure of five pounds and is utilized for rectification purposes. It may contain up to about 30% of ethyl alcohol. The other half of the vapors from the first effect passes to the steam chest of the second effect and the vapors from the second effect pass to the steam chest of the third effect. The condensates from the steam chests of both the second and third effects pass to the rectifying column. The vapors taken directly from the first effect are preferably conducted into the rectifying column at a point below that where the condensates from the other effects enter.

While the above description has been limited to direct flow evaporation, the principle of the invention is also applicable to counter-current and vapor compression systems, and it will be obvious that the arrangement of apparatus is subject to wide variation within the scope of the invention as defined by the appended claims.

This application is a continuation-in-part of my Patent No. 1,930,831.

I claim:

1. A process for the continuous multiple-effect evaporation of alcohol-containing fermented liquors for the recovery of alcohol and the production of a slop containing solid matter in high concentration, comprising introducing the liquor into the effect operating under the highest pressure, heating the liquor therein to such a temperature as to evaporate substantially all of the alcohol therefrom, subjecting about one-half of the alcoholic vapor from said effect to rectification, passing the remainder of the alcohol vapor to the second effect and concentrating the residue from said effect operating under the highest pressure by evaporating the water content thereof in further effects operating under successively lowered pressures.

2. A process for the continuous multiple-effect evaporation of alcohol-containing fermented liquors for the recovery of alcohol and the production of a slop containing solid matter in high concentration, comprising introducing the liquor into the effect operating under the highest pressure, heating the liquor therein to such a temperature as to evaporate all but a minor proportion of the alcohol, passing the residue into a further effect operating under lower pressure, evaporating therefrom the remaining small quantity of alcohol and a substantial proportion of water, passing the dealcoholized residue into a third effect operating under still lower pressure and evaporating therefrom a large portion of the remaining water content thereof and simultaneously separately passing into the rectifier and rectifying only a portion of that portion of the product of vaporization generated in the first effect especially rich in alcohol.

3. A process for the continuous multiple-effect evaporation of alcohol-containing fermented liquors for the recovery of alcohol and the production of a slop containing solid matter in high concentration, comprising introducing the liquor into the effect operating under the highest pressure, heating the liquor therein to such a temperature as to evaporate all but a minor proportion of the alcohol, passing the residue into a further effect operating under lower pressure, evaporating therefrom the remaining small quantity of alcohol and a substantial proportion of water, passing the dealcoholized residue into a third effect operating under still lower pressure and evaporating therefrom a large portion of the remaining water content thereof, the alcoholic vapor from the first of said effects being used to heat the second of said effects, the condensate thereby produced being subjected to rectification, and the vaporized portion being removed separately from the condensate.

4. A process for the continuous multiple-effect evaporation of alcohol-containing fermented liquors for the recovery of alcohol and the production of a slop containing solid matter in high concentration, comprising introducing the liquor into the effect operating under the highest pressure, heating the liquor therein to such a temperature as to evaporate all but a minor proportion of the alcohol, passing the residue into a further effect operating under lower pressure, evaporating therefrom the remaining small quantity of alcohol and a substantial proportion of water, passing the dealcoholized residue into a third effect operating under still lower pressure and evaporating therefrom a large portion of the remaining water content thereof, a portion of the alcoholic vapor from the first of said effects being condensed in heat exchange with the feed to said first effect and a further portion of said vapor being used to heat the second of said effects, condensates from said heat exchange and from said second effect being subjected to rectification and the vapors from them being carried off separately from the condensate.

5. A process for the continuous multiple effect evaporation of alcohol-containing fermented liquors for the recovery of a slop containing solid matter in high concentration, comprising introducing the liquor into the effect operating under the highest pressure, heating the liquor therein to such a temperature that practically all the alcohol is evaporated, heating the second effect by vapors from the first effect, concentrating the residue from the first effect by evaporating the water content thereof in further effects operating under successively lowered temperatures, and simultaneously separating the vapors from the first effect into portions, some of which are richer in alcohol than others and rectifying the richer portions of such vapors.

6. A process for the continuous multiple effect evaporation of alcohol-containing fermented liquors for the recovery of slop containing solid matter in high concentration, comprising introducing the liquor into the effect operating at the highest pressure, heating the liquor therein to such a temperature that practically all the alcohol is evaporated, heating the second effect by vapors from the first effect, maintaining the steam chest of the second effect at such a temperature that the alcoholic vapors from the first effect are condensed in said steam chest, rectifying the condensate and wasting the non-alcoholic gases and vapors, and concentrating the residue from the first effect by evaporating the water content thereof in further effects operating under successively lowered temperatures.

7. A process for the continuous multiple effect evaporation of alcohol-containing fermented liquors for the recovery of alcohol and the production of a slop containing solid matter in high concentration, comprising introducing the liquor into the effect operating under the highest pressure, heating the liquor therein to such a temperature as to evaporate substantially all of the alcohol therefrom, subjecting about one-half of the alcoholic vapor from said effect to rectification, passing the remainder of the alcoholic vapor to the steam chest of the second effect, condensing said alcoholic vapors therein, rectifying the condensate and wasting the non-alcoholic gases and vapors, and concentrating the residue from the first effect by evaporating the water content thereof in further effects operating under successively lowered pressures.

GUSTAVE T. REICH.